June 19, 1956 L. J. GIACOLETTO 2,751,496

OSCILLATOR

Filed Jan. 4, 1954

INVENTOR.

Laurence J. Giacoletto

BY Morris L. Rabkin

ATTORNEY

United States Patent Office 2,751,496

Patented June 19, 1956

2,751,496

OSCILLATOR

Lawrence J. Giacoletto, Princeton Junction, N. J., assignor to Radio Corporation of America, a corporation of Delaware Application January 4, 1954, Serial No. 401,810

6 Claims. (Cl. 250—36)

This invention relates to oscillator circuits, and more particularly to means for improving the operating efficiency of such oscillators.

In accordance with the present invention, there is provided a novel circuit including an oscillator tube and a tunable resonant circuit. The oscillator tube is normally non-conducting and means are provided for turning on the oscillator tube by an applied pulse. This permits energy to be stored in the plate tank circuit during the most efficient utilization period of the cycle of oscillation. The pulse width of the applied pulse determines the energy storage period. When the oscillator tube is cut off, the tank circuit voltage swings for a cycle and the tube is pulsed on again. A variable pulse width circuit generates the required pulses in response to an amplitude comparator. The amplitude comparator determines at what point on the tank voltage curve the tube is to be pulsed. The variable pulse width circuit then provides the pulse to cause current to flow in the oscillator tube.

It is an object of the present invention to provide an oscillator with improved operating efficiency.

It is another object of the invention to provide means for controlling an oscillator so as to utilize the output of the oscillator during the most efficient utilization period of the cycle of oscillation.

The features of the invention which are believed to be novel are set forth with particularity in the appended claims. The invention itself, both as to its organization and manner of operation together with further objects and advantages thereof, may be more fully appreciated by referring to the detailed specification taken in conjunction with the accompanying drawings, in which:

Figure 1:
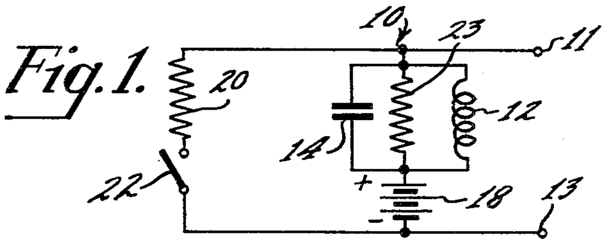
Figure 1 is a schematic diagram of a resonant circuit including an ideal switch.

Referring particularly to Figure 1, there is illustrated an idealized prototype of a large group of electrical oscillator circuits in which electrical energy in direct current form is converted into oscillatory form.

The parallel resonant circuit 10 comprises energy storing elements including a coil 12 in shunt with a capacitor 14. A source of potential $V_B$ is provided by a battery 18 in series with the parallel circuit 10 and a resistance 20 which represents the internal resistance of the potential source and of the circuit. A resistance 23 represents the resistance of the coil 12. A switch 22 is provided to periodically open and close the circuit comprising the battery 18 and circuit 10. The output voltage from this circuit is taken from a pair of output terminals 11 and 13.

Figure 2:
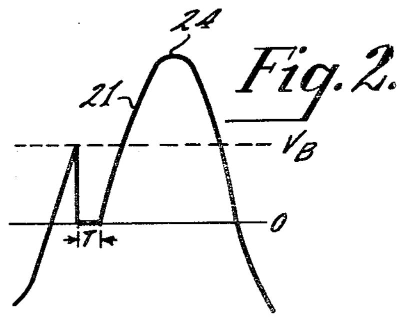
Figure 2 is a graph showing a curve to illustrate the output of the circuit shown in Figure 1.

When the switch 22 is closed at the moment the voltage across the circuit 10 is equal to $V_B$, the voltage at the terminals 11 and 13 drop to substantially zero as indicated by the curve shown in Figure 2. The capacitor 14 is charged during a period of time indicated by T. If the switch 22 is opened after an elapse of a predetermined period of time, the voltage output across the terminals 11 and 13 subsequently becomes considerably larger than $V_B$ as indicated by the peak 24 of the curve 21.

First, resonance operation is obtained when the tuned circuit 10 has a resonant frequency slightly higher than the operating frequency. If ohmic losses are small, the relation between the tuned circuit resonant frequency, $f_r$, and the operating frequency, $f_o$, is $$\frac{f_r}{f_o}=\frac{1}{1-f_oT}$$

where T is the time the switch 22 is closed. The resonance condition given above corresponds to a high operating efficiency. This high efficiency is brought about because the capacitor current is maximum at the time the switch 22 is closed and is in such a direction as to permit the absorption of the maximum amount of energy from the battery 18. Of course, the operating frequency may be any multiple of the operating frequency derived from the preceding formula. In such a case, each succeeding cycle of oscillation would be less in amplitude than the preceding cycle, but may still be considerably more than the battery voltage.

Figure 3:
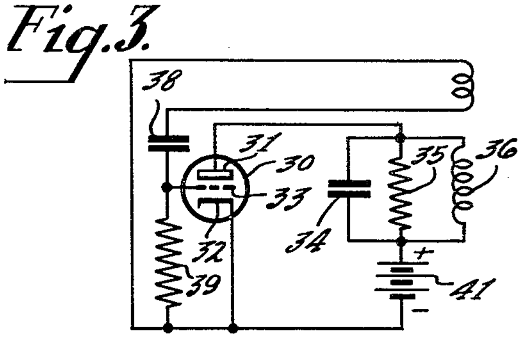
Figure 3 is a schematic diagram of a conventional feedback oscillator.

Referring particularly to Figure 3, the type of operation discussed in connection with the operation of the circuit of Figure 1, is not possible in the feedback oscillator shown, since $$\frac{f_r}{f_o}=1.0$$

in order for oscillations to exist.

Figure 4:
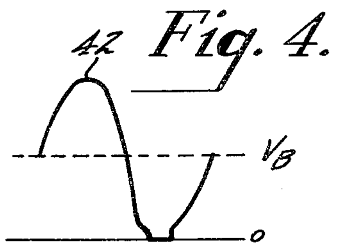
Figure 4 is a graph showing a curve to illustrate the output from the oscillator shown in Figure 3.

An electron discharge device includes an anode 31, a cathode 32 and a control element 33. A parallel resonant circuit similar to the one shown in Figure 1 comprises a capacitor 34, an inductor 36 and a resistance 35. A feedback of proper phase is provided from the plate to the grid circuit of the oscillator from the coil by means of a loop coil 37 and a capacitor 38. Grid bias is provided by means of a grid leak resistor 39 and a grid capacitor 38. The shape of the voltage output from the parallel tuned circuit is shown by a curve 42. (Figure 4.) It is seen that the peak output is equal to the battery voltage $V_B$. In contrast with the circuit of Figure 1, the circuit of Figure 3 has a capacitor current of approximately zero when the control device 30 is made conductive.

It is possible to operate an amplifier under the conditions last mentioned above, but in this case the tuned circuit tuning must be critically related to the input frequency by the relation last set forth above. This critical circuit tuning is difficult to obtain and maintain particularly in industrial applications where the variable load will vary the tuned circuit resonance. However, the circuit next to be described (Figure 5) provides stable high efficiency operation.

Figures 5, 6:
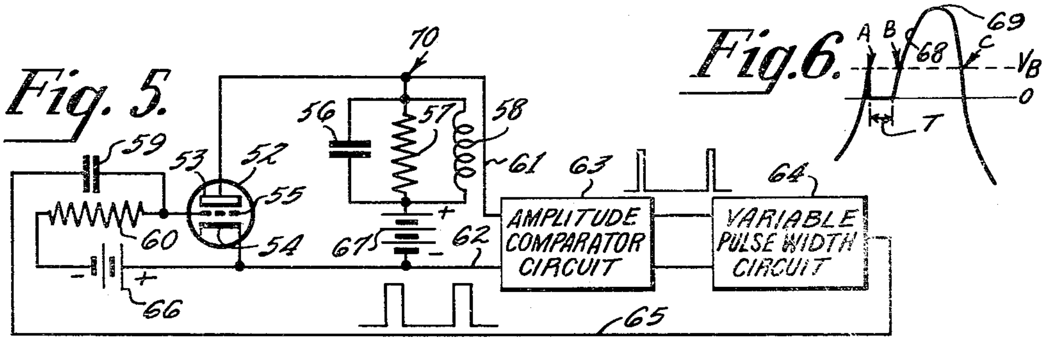
Figure 5 is a schematic diagram of an oscillator circuit embodying the present invention, shown partly in block diagram form.
Figure 6 is a graph showing a curve to illustrate the output of the circuit Figure 5.

Referring particularly to Figure 5, a tuned parallel circuit 70 comprising a capacitor 56, a resistor 57 and a coil 58 is used in conjunction with an electronic device, such as a tube 52. The tube 52 comprises a control grid 55, a cathode 54 and an anode 53. Operating potential is provided by a battery 67. A grid bias for the tube is provided through a resistor 60 by a battery 66. The tube 52 functions in a manner similar to the switch 22 described in connection with Figure 1.

The tube 52 is normally non-conducting. Upon the application of a positive pulse to the grid 55 through a coupling capacitor 59, the tube becomes conducting. This operation may be compared with a closing of a switch.

The output from the parallel circuit 70 is applied to an amplitude comparator circuit 63 through a pair of conductors 61 and 62. The shape of this voltage is illustrated by a curve 68 shown in Figure 6. The amplitude comparator circuit is designed to generate a pulse when the output voltage from the parallel circuit is at point A and not at points B and C. The time that the oscillator is controlled is therefore determined by the amplitude comparator circuit.

The voltage output from the amplitude comparator circuit is applied to a varying pulse width circuit 64. The function of the variable pulse width circuit is to utilize the pulse from the amplitude comparator circuit and stretch it to some predetermined and controllable width. The output pulse from the variable pulse width circuit is applied to the grid 55 through a conductor 65 and a coupling capacitor 59. The application of this pulse causes the electronic device 52 to conduct for a period of time equal to the width of the pulse.

It is thus seen that a circuit operation similar to the operation described in connection with Figure 1 is attained. The power into the output circuit will be approximately linearly proportional to the width control in the variable power width circuit.

The output power from the oscillator, therefore, may be varied by varying the width of the pulse applied to the grid of the oscillator tube. In industrial applications the pulse width may be controlled automatically so as to give the desired output characteristic. In such industrial applications, it is required that the pulse width be made small when the load on the oscillator is removed. This prevents the development of a large peak voltage across the output circuit. By modulating the pulse width, the output voltage amplitude is modulated.

Of course, the means controlling the flow of current into the tuned circuit may include means other than an electron discharge device such as gas tube, transistors, etc. An electron discharge device in association with the oscillating circuit is shown merely for purposes of illustration.

Figure 7:
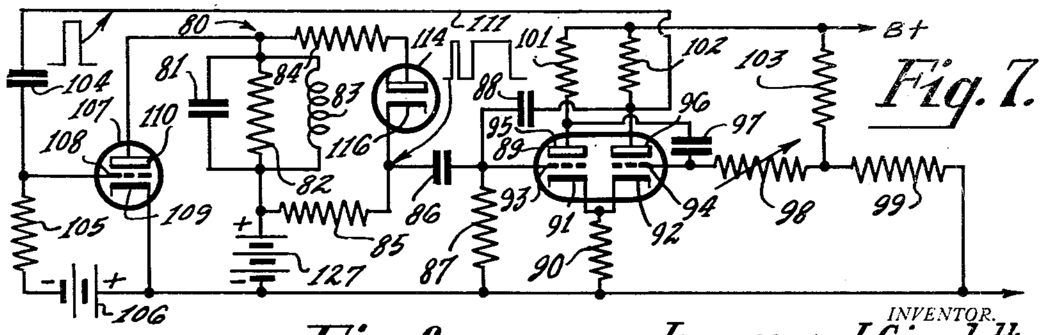
Figure 7 is a schematic diagram of a detailed circuit embodying the present invention.

Referring particularly to Figure 7, a parallel tuned circuit 80 is shown in conjunction with an electronic device, such as a tube 107. A parallel tuned circuit comprising a capacitor 81, a resistor 82 and a coil 83 operates in a similar manner to the circuit 10 described in connection with Figure 1. The tube 107 comprising a control grid 108, a cathode 109 and an anode 110, performs the function of the switch 22 shown in Figure 1.

The tube 107 is biased beyond cut-off by a potential from the battery 106 through a resistor 105. Upon the application of positive pulses to the grid 108 of the tube 107, it will conduct to give an effect of a closing of a switch, such as previously described. A positive potential for the plate 110 is provided by a battery 127.

The output voltage across the tuned circuit 80 is applied to a clipping tube 114 through the resistors 84 and 85. Resistor 84 is much larger than resistor 85 to provide a proper clipping action. The shape of the voltage at the cathode 116 of the clipping tube 114 is as indicated in the drawing.

Figure 8:
Figure 8 is a series of curves showing the output of the circuit shown in Figure 7.

This voltage is applied through a coupling capacitor 86 across a resistor 87. The shape of this voltage wave across the resistor 87 is illustrated by a curve 115 in Figure 8.

The next portion of the circuit is a conventional multivibrator circuit comprising twin triodes in a single envelope 89. The first triode comprises a cathode 91, a grid 93 and an anode 95. The second triode comprises a cathode 92, a control grid 94 and an anode 96. A resistor 90 provides a bias voltage for the triodes. Resistors 101 and 102 are load resistors. Plate 95 is coupled to the grid 94 and across the resistors 98 and 99 through a capacitor 97. The plate 96 is coupled to the grid 93 and across a resistor 87 through a capacitor 88. The shape of the voltage produced by the multivibrator which appears on the grid 93 is illustrated by a curve 118, shown in Figure 8. It is seen that the voltage from the clipping circuit, as illustrated by the curve 115, combines with the multi-vibrator voltage, as illustrated by the curve 118, to produce a combined voltage, the shape of which is illustrated by a curve 119. A resistor 103 is a voltage dropping resistor.

The duration of the resulting pulse generated by the single shot multi-vibrator, is controlled by the resistor 98. There is thus provided a means for varying the pulse to be applied to the oscillator tube 107 through a coupling capacitor 104.

It is seen that the capacitor 86 in conjunction with the resistor 87 forms a differentiating circuit to differentiate the voltage appearing across the resistor 85. The time constant of the capacitor 88 and the resistor 87 is chosen so that the first grid 93 is held at a negative potential for a short period of time after the completion of the pulse. The multi-vibrator, therefore, is not effected by the positive pulse immediately following the first positive pulse.

Under some circumstances the circuit illustrated in Figure 7 may include a free running multi-vibrator adjusted to have a free running period which is long compared to the normal operating period of the circuit. Again, an electron discharge device 107 has been shown in association with the oscillator circuit, it being understood that other control means may be employed.

It is seen that there has been provided a novel oscillator circuit which is more efficient than the conventional oscillators. The power output of this oscillator is readily controlled by varying the width of the pulse applied to the oscillator tube. This is very important in industrial applications, where it is often necessary to vary the degree of output when the load is varied.

What is claimed is:

1. An oscillator comprising a source of power, a resonant circuit having capacitive and inductive elements to produce an oscillating voltage, control means to periodically connect said source of power to said resonant circuit by the application of a pulse thereto, a variable pulse width circuit to produce electrical output pulses, means for applying said oscillating voltage to said pulse width circuit to initiate said pulse, and means for applying said pulses to said control means to connect said source of power to said resonant circuit for the duration of said pulse.

2. An oscillator comprising a source of potential, a parallel resonant circuit having capacitive and inductive elements, an electron discharge device comprising an anode, a cathode and a control element and having its space current path serially connected to said source of potential to said resonant circuit, means to normally bias said electron discharge device beyond cut-off, a variable pulse width circuit to produce electrical output pulses, and means for applying said pulses to said control element of said electron discharge device to cause current to flow in said electron discharge device for the duration of said pulses.

3. An oscillator comprising a source of potential, a resonant circuit having capacitive and inductive elements, to provide an oscillating voltage, a control means to periodically connect said source of potential to said resonant circuit upon the application of a pulse thereto, an amplitude comparator having an input and an output circuit, means for applying said oscillating voltage to said input circuit, a pulse circuit to produce electrical output pulses, means connecting said output circuit to said pulse circuit to provide a starting point for said pulses, means for varying the width of said pulse, and means for applying said pulses to said control means to connect said source of power to said resonant circuit for the duration of said pulses.

4. An oscillator comprising a source of potential, a resonant circuit having capacitive and inductive elements, to provide an oscillating output voltage, an electron discharge device having its space current path serially connecting said source of potential to said resonant circuit, means to normally bias said electron discharge device beyond cutoff, an amplitude comparator having an input and an output circuit, means for applying said oscillating output voltage to said input circuit, a variable pulse width circuit to produce electrical output pulses, means for connecting said output circuit to said variable pulse width, and means for applying said output pulses to said electron discharge device to cause current to flow therein for the duration of said pulses.

5. An oscillator in accordance with claim 4 wherein said variable pulse width circuit comprises a multivibrator circuit.

6. An oscillator in accordance with claim 5 wherein said amplitude comparator circuit comprises a voltage limiting circuit and a differentiating circuit.

References Cited in the file of this patent

UNITED STATES PATENTS

| | | |
|---|---|---|
| 2,457,062 | Moore | Dec. 21, 1948 |
| 2,506,770 | Braden | May 9, 1950 |
| 2,543,428 | Wendt et al. | Feb. 27, 1951 |